(12) United States Patent
Winger

(10) Patent No.: US 6,982,663 B2
(45) Date of Patent: Jan. 3, 2006

(54) METHOD AND SYSTEM FOR SYMBOL BINARIZATION

(75) Inventor: Lowell Winger, Waterloo (CA)

(73) Assignee: LSI Logic Corporation, Milpitas, CA (US)

( * ) Notice: Subject to any disclaimer, the term of this patent is extended or adjusted under 35 U.S.C. 154(b) by 7 days.

(21) Appl. No.: 10/770,213

(22) Filed: Feb. 2, 2004

(65) Prior Publication Data

US 2004/0150540 A1 Aug. 5, 2004

Related U.S. Application Data

(63) Continuation of application No. 10/191,596, filed on Jul. 10, 2002, now Pat. No. 6,744,387.

(51) Int. Cl.
*H03M 7/00* (2006.01)

(52) U.S. Cl. .................................... 341/107
(58) Field of Classification Search ............ 341/50, 341/51, 107, 106; 704/221, 222, 201, 204, 704/503, 500, 200, 211, 236
See application file for complete search history.

(56) References Cited

U.S. PATENT DOCUMENTS

| | | | |
|---|---|---|---|
| 5,471,207 A | 11/1995 | Zandi et al. ............ | 341/107 |
| 6,236,960 B1 * | 5/2001 | Peng et al. .............. | 704/211 |
| 6,636,222 B1 * | 10/2003 | Valmiki et al. .......... | 345/505 |
| 6,744,387 B2 * | 6/2004 | Winger ..................... | 341/50 |
| 6,850,568 B1 * | 2/2005 | Williams et al. ........ | 375/240.16 |
| 2004/0114683 A1 * | 6/2004 | Schwarz et al. ......... | 375/240.2 |

OTHER PUBLICATIONS

Article—pp. 308–311, Predictive Quantizing Systems by J.B. O'Neil, Jr. —Manuscript received Dec. 27, 1965.
Article—pp. 1098–1101, A Method for the Construction of Minimum–Redundancy Codes by David A. Huffman, no date given.
Article—pp. 689–721, A Compression Method for Clustered Bit–Vectors by Jukka Teuhola—Oct. 1978.
Article—pp. 399–401 of the publication entitled IEEE transactions on Information Theory, 1966, Sep.

* cited by examiner

*Primary Examiner*—Brian Young
(74) *Attorney, Agent, or Firm*—Christopher P. Maiorana

(57) ABSTRACT

The present invention is directed to an improved method for the binarization of data in an MPEG data stream. The invention makes use of unary binarization to create codewords up until an index threshold. Once the threshold has been met, succeeding code symbols have appended to them an exp-Golomb suffix. This hybrid binarization scheme reduces the number of binary codewords to be processed by a Binary Arithmetic Coder (BAC), thus reducing the computation required by the BAC.

21 Claims, 6 Drawing Sheets

Table 3 - Motion vector magnitude residual binarization.

| Index | Unary Prefix | exp-Golomb Suffix |
|---|---|---|
| 0 | 0 | |
| 1 | 10 | |
| 2 | 110 | |
| ... | | |
| 63 | 1...1 0 | |
| 64 | 1...1 1 0 | 0 |
| 65 | 1...1 1 0 | 1 |
| 66 | 1...1 1 10 | 00 |
| 67 | 1...1 1 10 | 01 |
| 68 | 1...1 1 10 | 10 |
| 69 | 1...1 1 10 | 11 |
| 70 | 1...1 1 110 | 000 |
| 71 | 1...1 1 110 | 001 |
| 72 | 1...1 1 110 | 010 |
| 73 | 1...1 1 110 | 011 |
| 74 | 1...1 1 110 | 100 |
| 75 | 1...1 1 110 | 101 |
| ... | | |

FIG. 5

Table 4 - Coefficient level binarization.

| Index | Unary Prefix | exp-Golomb Suffix |
|---|---|---|
| 0 | 0 | |
| 1 | 10 | |
| 2 | 110 | |
| ... | | |
| 15 | 1...1 0 | |
| 16 | 1...1 1 0 | 0 |
| 17 | 1...1 1 0 | 1 |
| 18 | 1...1 1 10 | 00 |
| 19 | 1...1 1 10 | 01 |
| 20 | 1...1 1 10 | 10 |
| 21 | 1...1 1 10 | 11 |
| 22 | 1...1 1 110 | 000 |
| 23 | 1...1 1 110 | 001 |
| 24 | 1...1 1 110 | 010 |
| 25 | 1...1 1 110 | 011 |
| 26 | 1...1 1 110 | 100 |
| 27 | 1...1 1 110 | 101 |
| ... | | |

FIG. 6

METHOD AND SYSTEM FOR SYMBOL BINARIZATION

This is a continuation of U.S. Ser. No. 10/191,596, filed Jul. 10, 2002, now U.S. Pat. No. 6,744,387.

FIELD OF THE INVENTION

The present invention relates generally to a system and method for the compression of digital signals. More specifically, the present invention relates to reducing the file size or the bit rate required by a system using binary arithmetic encoding to entropy encode a digital signal such as a digital image or digital video.

BACKGROUND OF THE INVENTION

Throughout this specification we will be using the term MPEG as a generic reference to a family of international standards set by the Motion Picture Expert Group. MPEG reports to sub-committee 29 (SC29) of the Joint Technical Committee (JTC1) of the International Organization for Standardization (ISO) and the International Electrotechnical Commission (IEC).

Throughout this specification the term H.26x will be used as a generic reference to a closely related group of international recommendations by the Video Coding Experts Group (VCEG). VCEG addresses Question 6 (Q.6) of Study Group 16 (SG16) of the International Telecommunications Union Telecommunication Standardization Sector (ITU-T). These standards/recommendations specify exactly how to represent visual and audio information in a compressed digital format. They are used in a wide variety of applications, including DVD (Digital Video Discs), DVB (Digital Video Broadcasting), Digital cinema, and videoconferencing.

Throughout this specification the term MPEG/H.26x will refer to the superset of MPEG and H.26x standards and recommendations.

A feature of MPEG/H.26x is that these standards are often capable of representing a video signal with data roughly $\frac{1}{50}^{th}$ the size of the original uncompressed video, while still maintaining good visual quality. Although this compression ratio varies greatly depending on the nature of the detail and motion of the source video, it serves to illustrate that compressing digital images is an area of interest to those who provide digital transmission. MPEG/H.26x achieves high compression of video through the successive application of four basic mechanisms:

1) Storing the luminance (black & white) detail of the video signal with more horizontal and vertical resolution than the two chrominance (colour) components of the video.
2) Storing only the changes from one video frame to another, instead of the entire frame. Thus, often storing motion vector symbols indicating spatial correspondence between frames.
3) Storing these changes with reduced fidelity, as quantized transform coefficient symbols, to trade-off a reduced number of bits per symbol with increased video distortion.
4) Storing all the symbols representing the compressed video with entropy encoding, which exploits the statistics of the symbols, to reduce the number of bits per symbol without introducing any additional video signal distortion.

With regard to point 4), the symbols may be encoded as codewords in a variety of ways. One such encoding is binarization. Small codewords are well handled by unary or exp-Golomb binarizations while large codewords are best represented with the binarization limited to a reasonable length. Thus there is a need for a method and system binarization system that retains the most valuable properties of the unary and exp-Golomb binarizations. That is, small codewords should be distinguishable as with a unary binarization, while large codewords should have their binarization limited to a reasonable length. A binarization that simultaneously satisfies these two requirements will reduce the complexity and the bitrate/size for compressing and decompressing video, images, and signals that are compressed using binary arithmetic encoding for entropy encoding. The present invention addresses this need.

SUMMARY OF THE INVENTION

The present invention is directed to a method of binarization, the method comprising the step of determining if a code symbol index value is less than a threshold value, if so then constructing a codeword using a first binarization model; else constructing a codeword using a second binarization model.

The present invention is also directed to a binarization system, the system comprising means for determining if a code symbol index value is less than a threshold value, if so then utilizing means for constructing a codeword using a first binarization model; else utilizing means for constructing a codeword using a second binarization model.

The present invention is further directed to a computer readable medium containing instructions for binarization, comprising instructions for determining if a code symbol index value is less than a threshold value, if so then constructing a codeword using a first binarization model; else constructing a codeword using a second binarization model.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which:

FIG. 5 is a table for motion vector magnitude residual binarization; and

FIG. 6 is a table for coefficient level binarization.

DETAILED DESCRIPTION OF THE INVENTION

Figure 1:
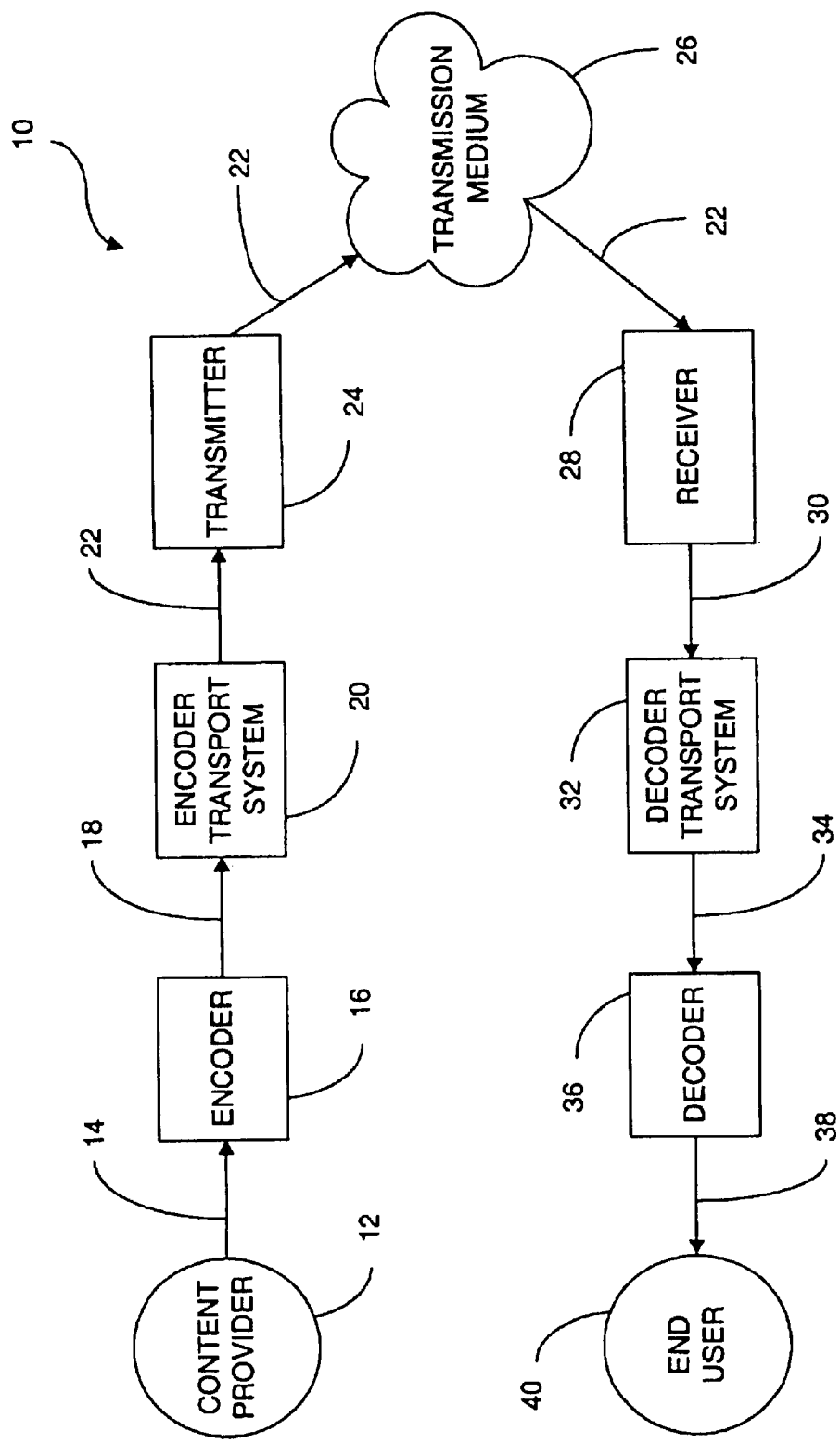
FIG. 1 is a block diagram of a video transmission and receiving system.

By way of introduction we refer first to FIG. 1, a video transmission and receiving system, is shown generally as 10. A content provider 12 provides a video source 14 to an encoder 16. A content provider may be anyone of a number of sources but for the purpose of simplicity one may view video source 14 as originating from a television transmission, be it analog or digital. Encoder 16 receives video source 14 and utilizes a number of compression algorithms to reduce the size of video source 14 and passes an encoded stream 18 to encoder transport system 20. Encoder transport system 20 receives stream 18 and restructures it into a transport stream 22 acceptable to transmitter 24. Transmitter 24 then distributes transport stream 22 through a transport medium 26 such as the Internet or any form of network enabled for the transmission of MPEG data streams. Receiver 28 receives transport stream 22 and passes it as received stream 30 to decoder transport system 32. In a perfect world, steams 22 and 30 would be identical. Decoder transport system 32 processes stream 30 to create a decoded stream 34. Once again, in a perfect world streams 18 and 34 would be identical. Decoder 36 then reverses the steps applied by encoder 16 to create output stream 38 that is delivered to the user 40.

There are several existing major MPEG/H.26x standards: H.261, MPEG-1, MPEG-2/H.262, MPEG-4/H.263. Among these, MPEG-2/H.262 is clearly most commercially significant, being sufficient for all the major TV standards, including NTSC (National Standards Television Committee) and HDTV (High Definition Television). Of the series of MPEG standards that describe and define the syntax for video broadcasting, the standard of relevance to the present invention is the draft standard ITU-T Recommendation H.264, ISO/IEC 14496-10 AVC, which is incorporated herein by reference and is hereinafter referred to as "MPEG-AVC/H.264".

An MPEG video transmission is essentially a series of pictures taken at closely spaced time intervals. In the MPEG/H.26x standards a picture is referred to as a "frame", and a "frame" is completely divided into rectangular sub-partitions known as "picture blocks", with associated "motion vectors". Often a picture may be quite similar to the one that precedes it or the one that follows it. For example, a video of waves washing up on a beach would change little from picture to picture. Except for the motion of the waves, the beach and sky would be largely the same. Once the scene changes, however, some or all similarity may be lost. The concept of compressing the data in each picture relies upon the fact that many images often do not change significantly from picture to picture, and that if they do the changes are often simple, such as image pans or horizontal and vertical block translations. Thus, transmitting only block translations (known as "motion vectors") and differences between picture blocks, as opposed to the entire picture, can result in considerable savings in data transmission.

Usually motion vectors are predicted, such that they are represented as a difference from their predictor, known as a predicted motion vector residual. In practice, the pixel differences between picture blocks are transformed into frequency coefficients, and then quantized to further reduce the data transmission. Quantization allows the frequency coefficients to be represented using only a discrete number of levels, and is the mechanism by which the compressed video becomes a "lossy" representation of the original video. This process of transformation and quantization is performed by an encoder.

Figure 2:
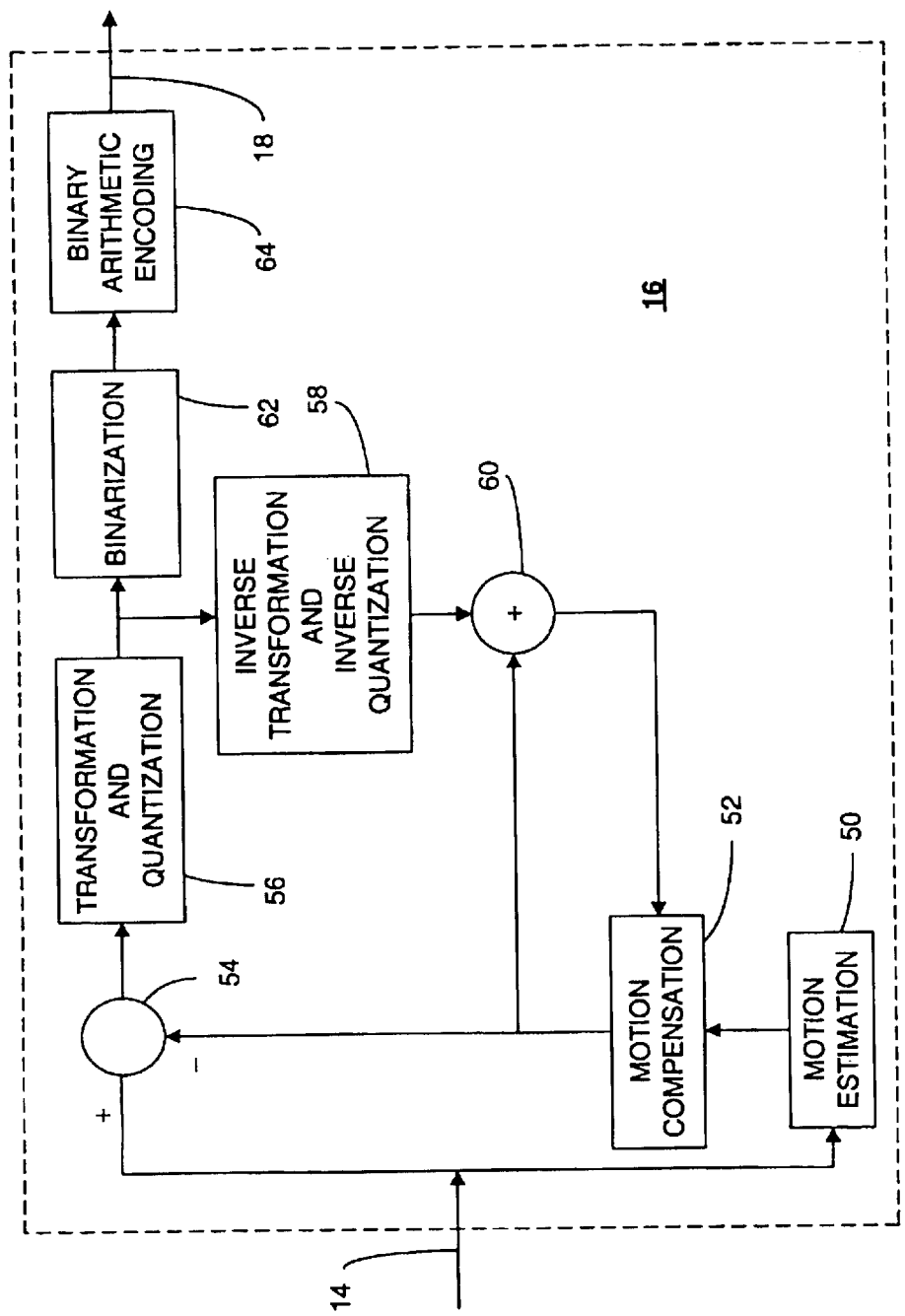
FIG. 2 is a block diagram of an encoder.

Referring now to FIG. 2 a block diagram of an encoder is shown generally as 16. Encoder 16 accepts as input video source 14. Video source 14 is passed to motion estimation module 50, which determines the motion difference between frames. The output of motion estimate module 50 is passed to motion compensation module 52. At combination module 54, the output of motion compensation module 52 is subtracted from the input video source 14 to create input to transformation and quantization module 56. Output from motion compensation module 52 is also provided to module 60. Module 56 transforms and quantizes output from module 54. The output of module 56 may have to be recalculated based upon prediction error, thus the loop comprising modules 52, 54, 56, 58 and 60. The output of module 56 becomes the input to inverse transformation module 58. Module 58 applies an inverse transformation and an inverse quantization to the output of module 56 and provides that to module 60 where it is combined with the output of module 52 to provide feedback to module 52.

Binarization module 62 is where the present invention resides. Module 62 accepts as input, symbols created by module 56 and creates a binary representation of each one in of the form of a codeword. The codewords are passed to binary arithmetic encoding module 64 where the frequency of each codeword is determined and the most frequently occurring codewords are assigned the lowest values. The output of module 64 is encoded stream 18.

With regard to the above description of FIG. 2, as those skilled in the art will appreciate that the functionality of the modules illustrated are well defined in the MPEG family of standards. Further, numerous variations of modules of FIG. 2 have been published and are readily available.

Figure 3:
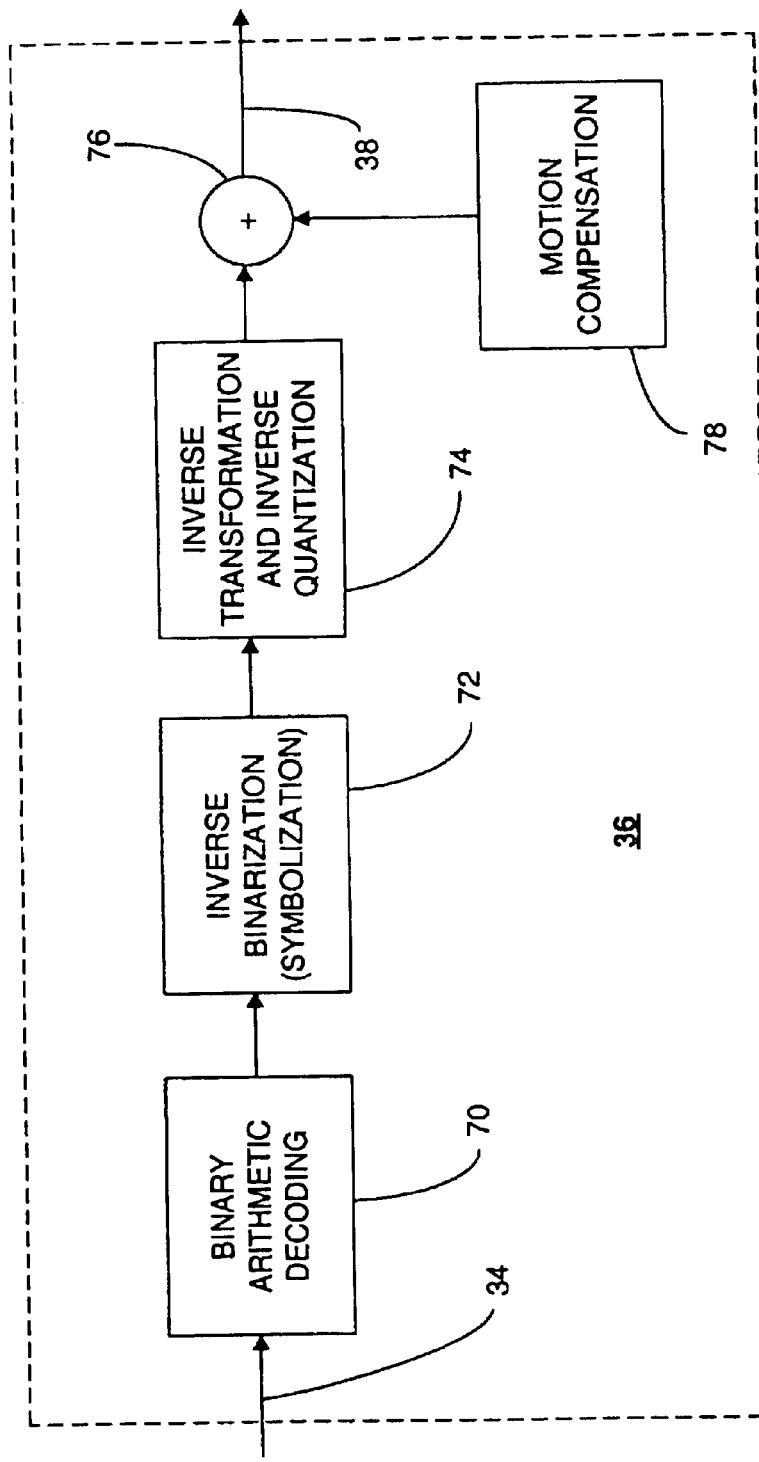
FIG. 3 is a block diagram of a decoder.

Referring now to FIG. 3 a block diagram of a decoder is shown. Decoder 36 accepts as input decoded stream 34 to binary arithmetic decoding module 70. Module 70 decodes the binary arithmetic encoding performed by module 64 (see FIG. 2) and passes the output to inverse binarization module 72. Module 72 reverses the binarization of module 62 (see FIG. 2) and passes its output to inverse transformation and inverse quantization module 74, which reverses the effects of module 56 (see FIG. 2). At combination module 76 the output from module 74 is combined with the output of motion compensation module 78 to create output stream 38.

The MPEG/H.26x standards define precisely the syntax that is used for specifying how quantized coefficients, motion vectors, and other associated information such as block modes are to be represented, as well as the semantics for reconstructing video source 14 from the syntax of encoded stream 18. In particular, codewords such as transformed-quantized picture differences and predicted motion vector residuals are entropy coded with such schemes as variable length codes (e.g. Huffman codes) or arithmetic encoding to become the syntax elements that form encoded bitstream 18.

Several types of arithmetic codecs (encoder/decoder pairs) exist. One of the most efficient is the family of binary arithmetic coders (BACs). Well-known members of this family include, among others, the Q-coder, QM-coder, MQ-coder, and Qx-coder. A BAC accepts as input a binary representation of a codeword and by recursively examining the codewords it receives, is able to compress the codewords based upon the probability of their frequency.

Since BACs operate only on binary valued data, a signal compression standard such as MPEG-AVC/H.264 maps codewords such as transformed-quantized picture differences and motion vector residuals to binarized symbol representations prior to binary arithmetic encoding.

Among the commonly used binarization methods are the following: unary, binary, Golomb, and exp-Golomb.

Unary binarization consists of a number of binary 1's equal to an index for a symbol followed by a zero as shown in Table 1.

TABLE 1

Binarization by means of the unary code tree

| Symbol Index | Codeword | | | | | | |
|---|---|---|---|---|---|---|---|
| 0 | 0 | | | | | | |
| 1 | 1 | 0 | | | | | |
| 2 | 1 | 1 | 0 | | | | |
| 3 | 1 | 1 | 1 | 0 | | | |
| 4 | 1 | 1 | 1 | 1 | 0 | | |
| 5 | 1 | 1 | 1 | 1 | 1 | 0 | |
| 6 | 1 | 1 | 1 | 1 | 1 | 1 | 0 |
| ... | . | . | . | . | . | . | . |
| bin_no. | 1 | 2 | 3 | 4 | 5 | 6 | 7 ... |

The first column of Table 1 contains an index for a symbol. The corresponding row for each index contains a binarization of the symbol represented by the index into a codeword. Thus symbol index "0" results in a codeword of a single bit, namely "0". Symbol "1" results in a codeword of "10", which comprises two bits, and so on. The row labeled bin_no at the bottom of Table 1 contains the frequency of each bit for a codeword. For example bin_no "1" will contain the number of 0's and 1's that occur as the first bit of a codeword. Similarly bin_no "2" contains the number of 0's and 1's in the second bit of a codeword, and so on.

A BAC by examining each bin_no can determine the length and frequency of a codeword by determining if there is a zero in the bin. For example bin_no "5" will contain a zero for each codeword having a length of five, thus allowing the BAC to determine the number or frequency of five bit codewords.

The advantage of the unary binarization is that a bin containing a value 0 distinguishes a particular codeword from all codewords with a larger symbol index. Therefore, the BAC can be constructed to separately account for the statistical frequency of every individual codeword by maintaining separate statistics on the frequency of zeroes and ones for every bin. A disadvantage of unary binarization is that in practice the statistics of high bins are lumped together since the smaller, more frequent codewords account for the majority of the bitstream, and infrequently occurring codewords do not occur often enough to enable accurate gathering of statistical data. A major disadvantage of unary binarization is that the number of binary values that must run through the BAC will, in the worst case, be as many bins as the largest symbol index (which may range into the tens of thousands). For example, the encoding of a large symbol index may require tens of thousands of binary bins to be sent through the BAC.

Binary binarization creates a codeword as a fixed length binary representation of the symbol index. Thus symbol index "3" is encoded as "11", with the appropriate number of leading zeros applied. The disadvantage of binary binarization is that a single bin no longer distinguishes each codeword uniquely. This results in a greatly reduced compression ratio.

Golomb and exp-Golomb codewords, which use a unary prefix followed by a binary postfix, may be regarded as compromise positions between unary and binary binarizations. Golomb codewords with parameter 'k' begin with unary binarizations as shown by the column labeled MSB (Most Significant Bits) in Table 2. Appended to the unary binarization are 'k' binary bits as is shown in the column labeled LSB (Least Significant Bits) in Table 2. This combination produces 2k distinct binarizations for each MSB. The example illustrated in Table 2 shows an exp-Golomb code with k=1, thus the first LSB contains 21 values. The next level contains 2**2 LSB values and so on. Unfortunately, this still permits extremely long binarizations to occur for large symbol indices.

TABLE 2

| Exp-Golomb codes. | | |
|---|---|---|
| Index | MSB | LSB |
| 0 | 0 | |
| 1 | 10 | 0 |
| 2 | 10 | 1 |
| 3 | 110 | 00 |
| 4 | 110 | 01 |
| 5 | 110 | 10 |
| 6 | 110 | 11 |
| 7 | 1110 | 000 |

TABLE 2-continued

| Exp-Golomb codes. | | |
|---|---|---|
| Index | MSB | LSB |
| 8 | 1110 | 001 |
| 9 | 1110 | 010 |
| 10 | 1110 | 011 |
| 11 | 1110 | 100 |
| 12 | 1110 | 101 |

The exp-Golomb code does greatly reduce the maximum possible number of bins in the binarization of symbol indices. However, it does not permit codewords with a small symbol index (other than index 0) to be uniquely distinguished from codewords with larger symbol indices. This results in reduced compression ratio for the binarizations, relative to the unary binarization of Table 1.

The present invention provides a binarization that retains the most valuable properties of the unary and exp-Golomb binarizations. That is, small codewords are distinguishable as with a unary binarization, while large codewords have their binarization limited to a reasonable length. By doing so, the present invention provides a binarization that reduces the complexity and the bitrate/size for compressing and decompressing video, images, and signals that are compressed using binary arithmetic encoding for entropy encoding.

The present invention allows for the maintenance of a true prefix code, while switching between a unary binarization for small codeword indices and a modified exp-Golomb binarization for larger codewords. The invention prepends a fixed prefix to an exp-Golomb code that begins at a fixed index value, prior to which unary binarization is used.

Referring to FIG. 5 and 6, Tables 3 and Table 4 demonstrate particular instances of this new class of binary codes: hybrid unary-exp-Golomb codes. Table 3 illustrates a binarization that is particularly appropriate for the binarization of quarter pixel motion vector residual magnitudes of MPEG-AVC/H.264.

With these binarizations illustrated in Tables 3 and 4, bitrate and complexity are both reduced for MPEG-AVC/H.264 relative to other known binarizations.

A detailed description of the method for constructing such hybrid binarizations follows. Let N be the threshold at which unary to exp-Golomb switching occurs (N=64 for Table 3, N=16 for Table 4). The construction of a codeword of this modified unary binarization table for a given index v is given by the following algorithm:

If v<N 1) use a unary code of v 1's terminated with a 0

If v>=N

1) Form an initial prefix of (N−1) 1's;

2) Determine the number of bits γ+1 required to represent v−(N−2). For example, for N=64, $\gamma=\lfloor \log_2(v-62) \rfloor$, and put it in a unary representation. The unary representation is appended to the initial prefix to form the unary prefix as shown in Tables 3 and 4.

3) Append the γ least significant bits of "g" where g=v−(N−2)−2**γ in its binary representation to the prefix.

4) The corresponding bits obtained at step 3) are shown in the exp-Golomb Suffix column of Tables 3 and 4.

Figure 4:
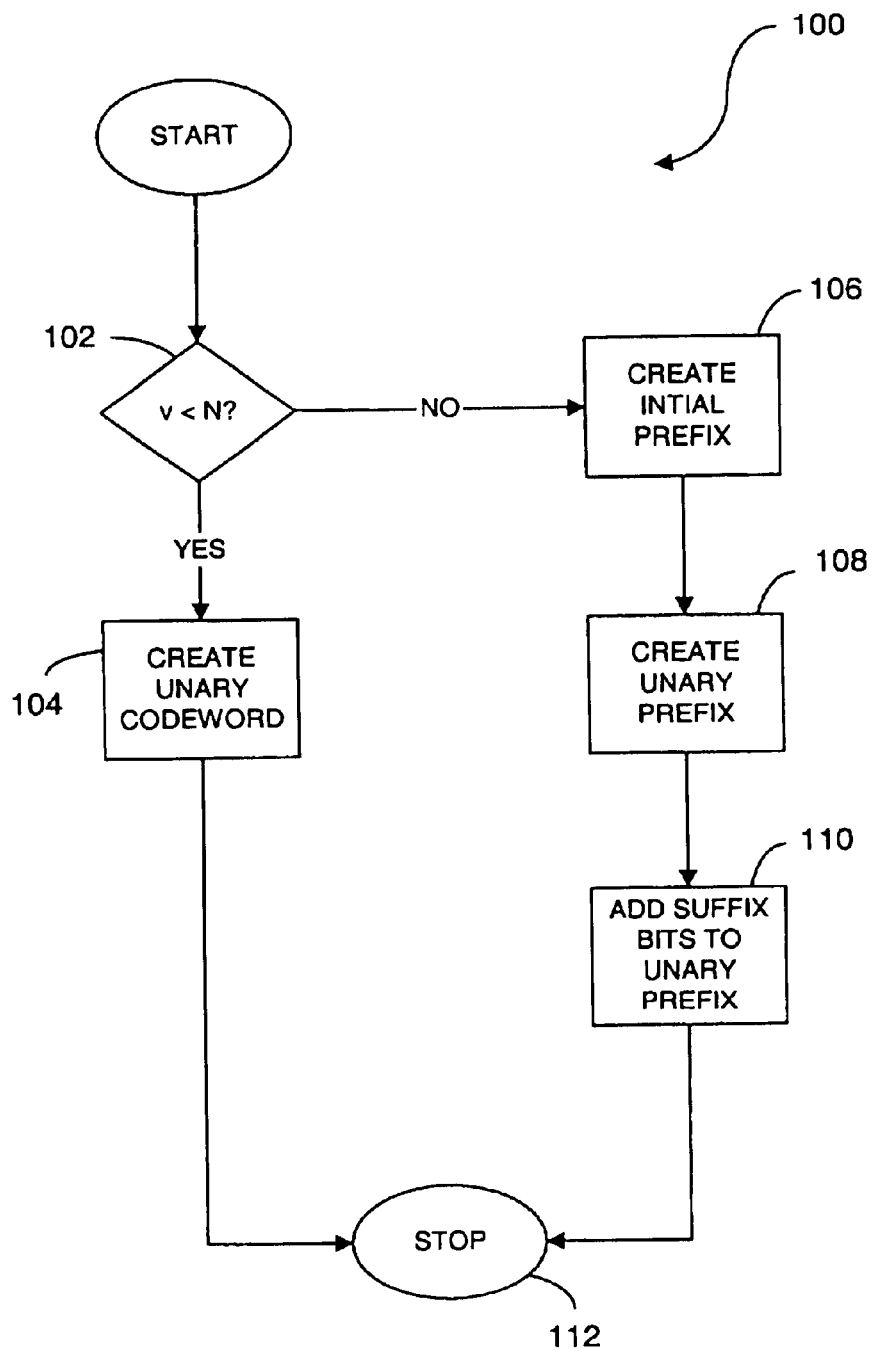
FIG. 4 is a flowchart of a process for codeword construction.

Referring now to FIG. 4, a flowchart of a process for codeword construction is shown generally as 100. Process 100 illustrates the steps of the present invention. Process 100 begins at step 102 where a test is made to determine if the value of the code symbol index is less than the value of the threshold. If it is processing moves to step 104 were a unary codeword is constructed comprising a series of v 1's terminated with a 0. Processing then ends at step 112. Returning to step 102 if the test is negative, processing moves to step 106, where an initial prefix of N 1's is created. Processing then moves to step 108 where the most significant bits of the value v−(N−2) are extracted and converted to a unary representation. The unary representation is then appended to the initial prefix to create a unary prefix. Process 100 then moves to step 110 where the binary representation of the least significant bits of the value of v−(N−2) are appended to the unary prefix to create the codeword.

Although the description of the present invention describes a binarization scheme for MPEG-AVC/H.264, it is not the intent of the inventors to restrict this binarization scheme solely to the referenced proposed standard. As one skilled in the art can appreciate any system utilizing BAC may make use of the present invention improve binarization.

Although the present invention has been described as being implemented in software, one skilled in the art will recognize that it may be implemented in hardware as well. Further, it is the intent of the inventors to include computer readable forms of the invention. Computer readable forms meaning any stored format that may be read by a computing device.

Although the invention has been described with reference to certain specific embodiments, various modifications thereof will be apparent to those skilled in the art without departing from the spirit and scope of the invention as outlined in the claims appended hereto.

What is claimed is:

1. A method for generating an index value from a codeword for digital video decoding, comprising the steps of:
   (A) setting said index value to a threshold in response to a first portion of said codeword having a first pattern;
   (B) adding an offset to said index value based on a second pattern in a second portion of said codeword following said first portion in response to said first portion having said first pattern; and
   (C) adding a value to said index value based on a third pattern in a third portion of said codeword following said second portion in response to said first portion having said first pattern.

2. The method according to claim 1, further comprising the step of:
   generating said index value based on a fourth pattern in said first portion in response to said fourth pattern being other than said first pattern.

3. The method according to claim 2, wherein said first pattern is a predetermined pattern unique from all possible representations of said fourth pattern.

4. The method according to claim 2, wherein said fourth pattern comprises (i) between zero and a plurality of first bits having a first state and (ii) a second bit having a second state opposite said first state.

5. The method according to claim 4, wherein said second bit follows said first bits.

6. The method according to claim 1, wherein said first pattern comprises a plurality of bits each having a first state.

7. The method according to claim 1, wherein said second pattern comprises between zero and a plurality of first bits having a first state and (ii) a second bit having a second state opposite said first state.

8. The method according to claim 1, wherein said third pattern comprises a binary number.

9. The method according to claim 1, wherein said codeword in compatible with at least one of an International Organization for Standardization/International Electrotechnical Commission 14496-10 standard and an International Telecommunication Union-Telecommunications Standardization Sector Recommendation H.264.

10. The method according to claim 1, further comprising the step of:
   generating said index value based on a fourth pattern in said first portion in response to said fourth pattern being other than said first pattern, wherein (i) said first pattern comprises a plurality of bits each having a first state, (ii) said first pattern is unique from all possible representations of said fourth pattern, (iii) each of said representations of said fourth pattern ends in a bit having a second state opposite said first state and (iv) said second pattern has a same number of bits as said third pattern.

11. A system comprising:
   a decoder configured to generate a codeword; and
   a circuit configured to (i) set an index value to a threshold in response to a first portion of said codeword having a first pattern, (ii) add an offset to said index value based on a second pattern in a second portion of said codeword following said first portion in response to said first portion having said first pattern and (iii) add a value to said index value based on a third pattern in a third portion of said codeword following said second portion in response to said first portion having said first pattern.

12. A method for generating a codeword from an index value for digital video encoding, comprising the steps of:
   (A) generating a first pattern in a first portion of said codeword in response to said index value being at least as great as a threshold;
   (B) generating a second pattern in a second portion of said codeword following said first portion representing an offset of said index value above said threshold; and
   (C) generating a third pattern in a third portion of said codeword following said second portion representing a value of said index value above said offset.

13. The method according to claim 12, further comprising the step of:
   generating a fourth pattern in said first portion based on said index value in response to said index value being below said threshold.

14. The method according to claim 13, wherein said first pattern is a predetermined pattern unique from all possible representations of said fourth pattern.

15. The method according to claim 13, wherein said fourth pattern comprises (i) between zero and a plurality of first bits having a first state and (ii) a second bit having a second state opposite said first state.

16. The method according to claim 12, wherein (i) said offset has a first representation and (ii) said value has a second representation different than said first representation.

17. The method according to claim 12, wherein said second pattern has a same number of bits as said third pattern.

18. The method according to claim 12, wherein said second portion is void in response to said index value being below said threshold.

19. The method according to claim 12, wherein said third portion is void in response to said index value being below said threshold.

20. The method according to claim 12, wherein said codeword in compatible with at least one of an International Organization for Standardization/International Electrotechnical Commission 14496-10 standard and an International Telecommunication Union-Telecommunications Standardization Sector Recommendation H.264.

21. A system comprising:
   a circuit configured to (i) generate a first pattern in a first portion of a codeword in response to an index value being at least as great as a threshold, (ii) generate a second pattern in a second portion of said codeword following said first portion representing an offset of said index value above said threshold and (iii) generating a third pattern in a third portion of said codeword following said second portion representing a value of said index value above said offset; and an encoder configured to encode said codeword.

* * * * *